United States Patent
Zhang et al.

(10) Patent No.: US 12,053,750 B2
(45) Date of Patent: Aug. 6, 2024

(54) PROCESSING SYSTEM WITH AGITATED NUTSCHE FILTER AND CONICAL DOUBLE HELIX DRYER

(71) Applicants: HEFEI GENERAL MACHINERY RESEARCH INSTITUTE CO., LTD, Hefei (CN); HEFEI GENERAL ENVIRONMENT CONTROL TECHNOLOGY CO., LTD, Hefei (CN)

(72) Inventors: Deyou Zhang, Hefei (CN); Cuilong Chen, Hefei (CN); Peizhong Zhuo, Hefei (CN); Chuanxiang Li, Hefei (CN); Daolin Chen, Hefei (CN)

(73) Assignees: HEFEI GENERAL MACHINERY RESEARCH INSTITUTE CO., LTD, Hefei (CN); HEFEI GENERAL ENVIRONMENT CONTROL TECHNOLOGY CO, LTD, Hefei (CN)

( * ) Notice: Subject to any disclaimer, the term of this patent is extended or adjusted under 35 U.S.C. 154(b) by 561 days.

(21) Appl. No.: 17/439,833

(22) PCT Filed: Mar. 3, 2021

(86) PCT No.: PCT/CN2021/078869
§ 371 (c)(1),
(2) Date: Sep. 16, 2021

(87) PCT Pub. No.: WO2022/016870
PCT Pub. Date: Jan. 27, 2022

(65) Prior Publication Data
US 2022/0305448 A1    Sep. 29, 2022

(30) Foreign Application Priority Data
Jul. 21, 2020    (CN) .......................... 202010704409.7

(51) Int. Cl.
*B01F 27/92*    (2022.01)
*B01F 33/80*    (2022.01)
(Continued)

(52) U.S. Cl.
CPC ............ *B01F 27/92* (2022.01); *B01F 33/821* (2022.01); *B01F 33/836* (2022.01); *F26B 25/04* (2013.01);
(Continued)

(58) Field of Classification Search
None
See application file for complete search history.

(56) References Cited

U.S. PATENT DOCUMENTS

| 151,640 | A | * | 6/1874 | Wheelwright | ........ F26B 17/003 366/147 |
| 277,876 | A | * | 5/1883 | Brown | .................... F26B 9/085 366/144 |

(Continued)

FOREIGN PATENT DOCUMENTS

| CN | 202270520 U | 6/2012 |
| CN | 103943847 A | 7/2014 |

(Continued)

OTHER PUBLICATIONS

Agitated Nutsche Filter—Wikipedia—Downloaded May 20, 2024, 3 Pages (Year: 2024).*
(Continued)

*Primary Examiner* — Robert J Popovics
(74) *Attorney, Agent, or Firm* — Bayramoglu Law Offices LLC

(57) ABSTRACT

An integrated production system for a ternary material includes an agitating device, a water washing tank, an agitated nutsche filter and a dryer arranged in sequence along a travel path of a ternary material, where the agitating (Continued)

device is used to agitate a material; the water washing tank is used to carry out even pulping and provide a reaction space; the agitated nutsche filter is used to realize an agitating and filtering operation on the material; the dryer is used to dry the material. The integrated production system can meet the high requirements of the large-scale ternary material production for the water content, washing effect, particle crystal form, purity and closed operation. The integrated production system can also effectively ensure the production capacity and production efficiency of the system while satisfying the requirements of green manufacturing for efficiency enhancement, energy saving, consumption reduction and emission reduction.

20 Claims, 6 Drawing Sheets

(51) Int. Cl.
    *B01F 33/82*         (2022.01)
    *F26B 25/04*         (2006.01)
    *F26B 25/06*         (2006.01)

(52) U.S. Cl.
    CPC ........ *F26B 25/063* (2013.01); *F26B 2200/08* (2013.01)

(56) References Cited

U.S. PATENT DOCUMENTS

| | | | | |
|---|---|---|---|---|
| 299,898 | A * | 6/1884 | Wright | F26B 9/085 34/181 |
| 310,126 | A * | 12/1884 | Dawson | B01F 27/112 241/245 |
| 442,213 | A * | 12/1890 | Young | A23G 9/12 165/109.1 |
| 559,249 | A * | 4/1896 | Wright | B01D 29/01 210/267 |
| 624,633 | A * | 5/1899 | Edwardes | B01D 21/0012 210/330 |
| 630,309 | A * | 8/1899 | Aberg | B03B 5/62 209/173 |
| 684,555 | A * | 10/1901 | Simpson | B01D 29/05 210/414 |
| 903,697 | A * | 11/1908 | Frasch | B01D 24/007 210/415 |
| 1,043,939 | A * | 11/1912 | Isherwood | B01D 29/00 210/179 |
| 1,135,080 | A * | 4/1915 | Vandercook | C02F 3/1257 210/194 |
| 1,139,825 | A * | 5/1915 | Vandercook | B01D 35/16 210/779 |
| 1,180,020 | A * | 4/1916 | Dilg | B01F 27/702 366/300 |
| 1,461,148 | A * | 7/1923 | Hughes | F26B 11/14 34/186 |
| 1,567,990 | A * | 12/1925 | Apablasa | B01D 29/6476 210/120 |
| 1,574,557 | A * | 2/1926 | Coe | B01D 24/4869 210/272 |
| 1,661,290 | A * | 3/1928 | Jewett | B01D 35/027 210/455 |
| 1,667,465 | A * | 4/1928 | Wait | B01D 33/466 210/791 |
| 1,686,017 | A * | 10/1928 | Lovett | C11B 1/12 210/314 |
| 1,741,334 | A * | 12/1929 | Pietzsch | B01D 29/05 210/239 |
| 1,760,374 | A * | 5/1930 | Pepper | F26B 11/14 366/98 |
| 1,822,486 | A * | 9/1931 | Heritage | F26B 3/22 366/252 |
| 1,864,757 | A * | 6/1932 | Pietzsch | B01D 24/461 210/542 |
| 1,864,825 | A * | 6/1932 | Jewett | B01D 29/01 210/239 |
| 1,865,061 | A * | 6/1932 | Grob | B01D 24/4807 210/769 |
| 1,891,396 | A * | 12/1932 | Prutzman | B01D 25/1645 210/219 |
| 1,957,303 | A * | 5/1934 | Tietig | B01D 24/4846 210/219 |
| 2,014,945 | A * | 9/1935 | Mayer | C12C 7/06 210/219 |
| 2,089,702 | A * | 8/1937 | Lomax | B01D 29/6476 210/408 |
| 2,107,040 | A * | 2/1938 | Lomax | B01D 29/906 210/773 |
| 2,247,439 | A * | 7/1941 | Hawes | B01F 27/92 366/324 |
| 2,295,098 | A * | 9/1942 | Cornell, Jr. | A01J 11/04 366/349 |
| 2,345,063 | A * | 3/1944 | Nauta | B01F 27/953 366/287 |
| 2,345,697 | A * | 4/1944 | Boyce | C10M 175/0058 34/92 |
| 2,404,215 | A * | 7/1946 | Cavanaugh | B01D 36/02 210/415 |
| 2,668,764 | A * | 2/1954 | Nauta | B01F 27/953 366/195 |
| 2,799,947 | A * | 7/1957 | Elwess | F26B 21/086 34/92 |
| 2,824,646 | A * | 2/1958 | Willenborg | F26B 21/14 210/771 |
| 2,831,663 | A * | 4/1958 | Nauta | B01F 27/953 475/11 |
| 2,834,474 | A * | 5/1958 | Jalkanen | B01D 33/17 210/108 |
| 2,840,357 | A * | 6/1958 | Nauta | B01F 27/951 241/38 |
| 2,893,709 | A * | 7/1959 | Nauta | B01F 27/953 366/290 |
| 2,909,286 | A * | 10/1959 | Norell | B01D 29/94 210/408 |
| 2,964,179 | A * | 12/1960 | Loevenstein | B01D 21/06 210/801 |
| 2,967,695 | A * | 1/1961 | Nauta | B01F 27/953 366/292 |
| 2,987,444 | A * | 6/1961 | Allardice | B01D 1/18 530/355 |
| 3,034,895 | A * | 5/1962 | O'Malley | C12C 7/065 99/278 |
| 3,055,208 | A * | 9/1962 | Gallus | B01D 29/03 210/415 |
| 3,109,633 | A * | 11/1963 | Nauta | B01F 27/953 416/177 |
| 3,118,655 | A * | 1/1964 | Naute | B22C 5/0472 366/319 |
| 3,214,019 | A * | 10/1965 | Griffin, III | E21B 21/06 415/121.2 |
| 3,249,342 | A * | 5/1966 | Mikkelsen | B01F 27/13 366/195 |
| 3,272,481 | A * | 9/1966 | Nauta | B01F 27/953 366/287 |
| 3,315,947 | A * | 4/1967 | Nauta | B01F 27/953 366/244 |
| 3,338,562 | A * | 8/1967 | Fox | B01F 27/953 366/290 |
| 3,339,759 | A * | 9/1967 | Wellons | B65D 88/68 222/404 |
| 3,380,373 | A * | 4/1968 | Lenz | C12C 7/17 99/278 |
| 3,412,863 | A * | 11/1968 | Stuart, Sr. | B01D 24/22 239/254 |
| 3,434,697 | A * | 3/1969 | Carlson | A22C 5/00 177/112 |
| 3,441,141 | A * | 4/1969 | Eicher | B01D 29/6476 210/414 |

(56) References Cited

U.S. PATENT DOCUMENTS

| | | | | |
|---|---|---|---|---|
| 3,450,390 A * | 6/1969 | Nauta | B01F 27/953 | 366/100 |
| 3,456,708 A * | 7/1969 | Strandell | F26B 11/14 | 209/11 |
| 3,460,681 A * | 8/1969 | List | B01D 29/118 | 210/415 |
| 3,528,365 A * | 9/1970 | List | B01D 29/828 | 100/37 |
| 3,533,604 A * | 10/1970 | Sabelis | B01F 27/953 | 366/287 |
| 3,536,301 A * | 10/1970 | Berker | B01F 29/64 | 366/224 |
| 3,539,155 A * | 11/1970 | Agranat | B01D 61/145 | 210/223 |
| 3,556,487 A * | 1/1971 | Nauta | B01F 27/953 | 366/252 |
| 3,594,991 A * | 7/1971 | Berz | B01D 50/00 | 55/432 |
| 3,602,486 A * | 8/1971 | Nauta | B01F 27/953 | 366/261 |
| 3,612,492 A * | 10/1971 | Nauta | B01F 27/953 | 366/65 |
| 3,612,493 A * | 10/1971 | Nauta | B01F 27/953 | 384/129 |
| 3,614,070 A * | 10/1971 | Loomans | B01F 27/953 | 366/287 |
| 3,659,826 A * | 5/1972 | Nauta | B01F 27/953 | 366/287 |
| 3,703,772 A * | 11/1972 | McHugh | F26B 7/005 | 34/341 |
| 3,734,472 A * | 5/1973 | Strohmeier | B29B 7/60 | 366/156.2 |
| 3,743,539 A * | 7/1973 | Kroyer et al. | B01D 9/0031 | 241/46.11 |
| 3,746,314 A * | 7/1973 | Nauta | B01F 27/95 | 366/292 |
| 3,754,466 A * | 8/1973 | Taralli | A23G 1/06 | 99/348 |
| 3,775,863 A * | 12/1973 | Updegrove | B01F 33/402 | 366/144 |
| 3,799,917 A * | 3/1974 | Rathke | B01F 27/953 | 526/343 |
| 3,834,296 A * | 9/1974 | Kehse | C12C 7/06 | 99/276 |
| 3,836,464 A * | 9/1974 | Brookins et al. | B01D 29/58 | 210/489 |
| 3,861,656 A * | 1/1975 | Schmitt | B01F 27/953 | 366/244 |
| 3,875,683 A * | 4/1975 | Waters | F26B 21/10 | 34/174 |
| 3,899,159 A * | 8/1975 | Nauta | B01F 27/951 | 366/292 |
| 3,913,238 A * | 10/1975 | Updegrove | F26B 11/12 | 34/76 |
| 3,923,204 A * | 12/1975 | Kato | B65D 88/68 | 366/186 |
| 3,937,444 A * | 2/1976 | Kapp | B01F 27/953 | 366/244 |
| 3,980,560 A * | 9/1976 | Eades | B01D 29/05 | 210/232 |
| 3,989,470 A * | 11/1976 | Czurak | C05C 9/005 | 528/242 |
| 4,072,297 A * | 2/1978 | de Vries | B01F 27/953 | 366/318 |
| 4,081,381 A * | 3/1978 | Rosenmund | B01D 29/84 | 210/414 |
| 4,094,784 A * | 6/1978 | Hirano | B01D 33/52 | 210/780 |
| 4,101,116 A * | 7/1978 | Haag | B01F 27/23 | 366/318 |
| 4,123,174 A * | 10/1978 | Titus | B01F 27/953 | 366/318 |
| 4,127,333 A * | 11/1978 | Wlodarski | B01F 27/953 | 366/131 |
| 4,145,144 A * | 3/1979 | Nauta | B01F 27/953 | 366/311 |
| 4,188,132 A * | 2/1980 | Lenart | B01J 8/10 | 366/314 |
| 4,217,996 A * | 8/1980 | Good | B01F 25/80 | 222/404 |
| 4,245,399 A * | 1/1981 | Muller | F26B 17/22 | 34/166 |
| 4,274,751 A * | 6/1981 | Rector | B01J 19/002 | 366/310 |
| 4,310,124 A * | 1/1982 | Schwing | B02C 18/08 | 241/46.11 |
| 4,376,705 A * | 3/1983 | Komura | B01D 29/055 | 210/413 |
| 4,399,042 A * | 8/1983 | Stannard | B01D 29/6446 | 210/791 |
| 4,417,980 A * | 11/1983 | Baur | B01D 29/70 | 210/91 |
| 4,422,772 A * | 12/1983 | Baumgartner | B01F 29/82 | 366/331 |
| 4,430,156 A * | 2/1984 | Casper | F26B 7/00 | 159/901 |
| 4,437,766 A * | 3/1984 | Joachim | B01F 27/951 | 366/292 |
| 4,437,767 A * | 3/1984 | Hargis | B01F 35/4121 | 366/331 |
| 4,439,044 A * | 3/1984 | Buttiker | B01F 31/56 | 366/241 |
| 4,472,060 A * | 9/1984 | Hargis | B01F 35/4121 | 366/100 |
| 4,499,669 A * | 2/1985 | Haeck | F26B 3/00 | 34/166 |
| 4,515,483 A * | 5/1985 | Muller | B01F 27/091 | 366/311 |
| 4,516,860 A * | 5/1985 | van der Laan | B01F 27/953 | 366/287 |
| 4,534,658 A * | 8/1985 | De Vries | B01F 27/953 | 277/549 |
| 4,542,682 A * | 9/1985 | Hancock | C12C 7/17 | 210/534 |
| 4,577,973 A * | 3/1986 | Occelli | B01F 27/88 | 366/139 |
| 4,588,301 A * | 5/1986 | Bolz | B01F 27/953 | 366/314 |
| 4,592,835 A * | 6/1986 | Grieder | B01D 29/01 | 210/531 |
| 4,599,170 A * | 7/1986 | Friedman | B01D 65/08 | 210/232 |
| 4,619,052 A * | 10/1986 | Osburn | E21B 21/063 | 34/92 |
| 4,622,152 A * | 11/1986 | Resing | F26B 7/00 | 210/414 |
| 4,668,099 A * | 5/1987 | Bolz | B01F 35/4121 | 277/398 |
| 4,690,989 A * | 9/1987 | Kolinsky | C08F 14/06 | 422/135 |
| 4,770,772 A * | 9/1988 | Kuwajima | B01F 35/16 | 210/402 |
| 4,778,605 A * | 10/1988 | Anthoney | B01D 36/001 | 159/901 |
| 4,828,697 A * | 5/1989 | Kuhnt | B01D 29/6476 | 210/408 |
| 4,839,969 A * | 6/1989 | Hahn | B29B 9/16 | 34/169 |
| 4,888,111 A * | 12/1989 | Diemer | B01D 35/16 | 366/147 |
| 4,914,834 A * | 4/1990 | Sime | F26B 17/124 | 34/174 |
| 4,915,506 A * | 4/1990 | Sato | F26B 11/12 | 34/179 |
| 4,974,336 A * | 12/1990 | Hahn | F26B 21/14 | 34/443 |
| 4,975,183 A * | 12/1990 | Glorer | B01D 29/76 | 210/104 |

(56) References Cited

U.S. PATENT DOCUMENTS

| | | | | | |
|---|---|---|---|---|---|
| 4,980,029 | A | * | 12/1990 | Bolz | C10B 47/18 |
| | | | | | 202/217 |
| 4,990,346 | A | * | 2/1991 | Strippler | C12C 7/17 |
| | | | | | 426/231 |
| 4,992,171 | A | * | 2/1991 | Hetzel | B01D 29/01 |
| | | | | | 210/415 |
| 5,026,169 | A | * | 6/1991 | Titus | B01F 35/4121 |
| | | | | | 366/314 |
| 5,071,546 | A | * | 12/1991 | Ruegg | B01D 29/05 |
| | | | | | 210/455 |
| 5,123,748 | A | * | 6/1992 | Schroer | B01F 27/953 |
| | | | | | 366/147 |
| 5,139,667 | A | * | 8/1992 | Reneau, Jr. | B01D 29/6476 |
| | | | | | 366/289 |
| 5,143,630 | A | * | 9/1992 | Rolchigo | B01D 33/722 |
| | | | | | 210/405 |
| 5,183,540 | A | * | 2/1993 | Rubin | B01D 3/10 |
| | | | | | 202/205 |
| 5,255,444 | A | * | 10/1993 | Oess | F26B 3/347 |
| | | | | | 34/259 |
| 5,259,955 | A | * | 11/1993 | Bolton | B01D 29/945 |
| | | | | | 239/524 |
| 5,269,923 | A | * | 12/1993 | Diemer | B01D 29/94 |
| | | | | | 210/415 |
| 5,298,389 | A | * | 3/1994 | Possanza | G03C 1/005 |
| | | | | | 430/642 |
| 5,302,685 | A | * | 4/1994 | Tsumura | C07F 7/089 |
| | | | | | 203/91 |
| 5,356,541 | A | * | 10/1994 | Wickzell | B01D 29/118 |
| | | | | | 210/791 |
| 5,362,329 | A | * | 11/1994 | Yoshino | C08B 30/12 |
| | | | | | 127/65 |
| 5,382,092 | A | * | 1/1995 | Okamoto | B01F 27/1123 |
| | | | | | 416/177 |
| 5,415,781 | A | * | 5/1995 | Randhahn | B01D 29/055 |
| | | | | | 210/232 |
| 5,447,369 | A | * | 9/1995 | Boxall | B01F 27/9214 |
| | | | | | 241/46.11 |
| 5,505,537 | A | * | 4/1996 | Previero | B01F 35/75455 |
| | | | | | 366/147 |
| 5,542,762 | A | * | 8/1996 | Nakanishi | B01F 35/32 |
| | | | | | 366/273 |
| 5,544,424 | A | * | 8/1996 | Haleen | F26B 5/04 |
| | | | | | 34/166 |
| 5,544,425 | A | * | 8/1996 | Haleen | F26B 11/14 |
| | | | | | 34/166 |
| 5,546,676 | A | * | 8/1996 | Haleen | F26B 3/092 |
| | | | | | 34/166 |
| 5,564,350 | A | * | 10/1996 | Peplinski | B01D 29/86 |
| | | | | | 110/259 |
| 5,567,615 | A | * | 10/1996 | Degen | B01J 20/3257 |
| | | | | | 424/157.1 |
| 5,609,835 | A | * | 3/1997 | Pitcher | B01J 19/0053 |
| | | | | | 366/14 |
| 5,614,093 | A | * | 3/1997 | Mueggenburg | B01D 39/10 |
| | | | | | 210/488 |
| 5,649,765 | A | * | 7/1997 | Stokes | B01F 27/953 |
| | | | | | 366/310 |
| 5,653,869 | A | * | 8/1997 | Evangelisti | B01D 29/05 |
| | | | | | 210/453 |
| 5,659,971 | A | * | 8/1997 | Haleen | F26B 21/14 |
| | | | | | 34/166 |
| 5,674,956 | A | * | 10/1997 | Nakamoto | B01F 35/95 |
| | | | | | 526/88 |
| 5,683,178 | A | * | 11/1997 | Nakamoto | B01F 35/92 |
| | | | | | 416/227 R |
| 5,702,762 | A | * | 12/1997 | Baba | H01M 4/32 |
| | | | | | 427/372.2 |
| 5,709,036 | A | * | 1/1998 | Haleen | F26B 5/04 |
| | | | | | 34/95 |
| 5,725,939 | A | * | 3/1998 | Nishibori | B01F 35/92 |
| | | | | | 428/326 |
| 5,746,007 | A | * | 5/1998 | Haleen | F26B 21/14 |
| | | | | | 34/166 |
| 5,759,231 | A | * | 6/1998 | Bremer | C22B 1/005 |
| | | | | | 75/416 |
| 5,801,205 | A | * | 9/1998 | Nishibori | B01F 35/751 |
| | | | | | 521/137 |
| 5,890,803 | A | * | 4/1999 | Jolink | B01F 27/953 |
| | | | | | 366/170.3 |
| 5,904,843 | A | * | 5/1999 | Herbst | B01D 29/945 |
| | | | | | 210/414 |
| 5,947,645 | A | * | 9/1999 | Rixom | G01G 13/24 |
| | | | | | 406/48 |
| 6,058,623 | A | * | 5/2000 | Brooks | F26B 7/00 |
| | | | | | 34/493 |
| 6,167,637 | B1 | * | 1/2001 | Nagase | B01D 29/822 |
| | | | | | 34/388 |
| 6,207,339 | B1 | * | 3/2001 | Kato | G03G 9/0806 |
| | | | | | 430/138 |
| 6,364,224 | B1 | * | 4/2002 | Pearce | F26B 3/205 |
| | | | | | 241/23 |
| 6,381,866 | B2 | * | 5/2002 | Gehrmann | B01F 35/75455 |
| | | | | | 34/558 |
| 6,390,664 | B1 | * | 5/2002 | Kniele | B01F 27/9211 |
| | | | | | 366/601 |
| 6,487,788 | B2 | * | 12/2002 | Gehrmann | B01D 3/06 |
| | | | | | 34/558 |
| 6,520,671 | B1 | * | 2/2003 | Halter | B01F 35/7544 |
| | | | | | 366/156.2 |
| 6,595,678 | B2 | * | 7/2003 | Folestad | B01F 35/213 |
| | | | | | 366/142 |
| 6,599,005 | B2 | * | 7/2003 | Van Der Wel | B01F 27/806 |
| | | | | | 366/326.1 |
| 6,601,315 | B2 | * | 8/2003 | Stafford | F26B 21/083 |
| | | | | | 34/352 |
| 6,627,374 | B2 | * | 9/2003 | Fumita | G03G 9/0815 |
| | | | | | 430/137.17 |
| 6,814,878 | B2 | * | 11/2004 | Tully | B01J 8/006 |
| | | | | | 422/232 |
| 6,890,129 | B2 | * | 5/2005 | Fabbri | B01D 29/86 |
| | | | | | 406/146 |
| 6,916,425 | B2 | * | 7/2005 | Lotz | C12C 7/165 |
| | | | | | 210/651 |
| 6,959,504 | B2 | * | 11/2005 | Fabbri | B01D 29/94 |
| | | | | | 34/179 |
| 6,993,856 | B2 | * | 2/2006 | Benali | F26B 3/088 |
| | | | | | 34/174 |
| 7,020,984 | B2 | * | 4/2006 | Knorr | F26B 11/14 |
| | | | | | 34/594 |
| 7,144,147 | B2 | * | 12/2006 | Folestad | B01F 35/213 |
| | | | | | 366/132 |
| 7,150,987 | B2 | * | 12/2006 | Ueda | C12M 23/58 |
| | | | | | 435/290.4 |
| 7,387,427 | B2 | * | 6/2008 | Chiang | F26B 11/12 |
| | | | | | 366/102 |
| 7,473,375 | B2 | * | 1/2009 | Stoerzer | B01D 29/01 |
| | | | | | 210/791 |
| 7,530,731 | B2 | * | 5/2009 | Toncelli | B01F 23/54 |
| | | | | | 366/288 |
| 7,713,411 | B2 | * | 5/2010 | Banister | F26B 3/08 |
| | | | | | 210/791 |
| 7,736,526 | B2 | * | 6/2010 | Smith | B01D 33/15 |
| | | | | | 210/780 |
| 8,057,685 | B2 | * | 11/2011 | Laing | B01D 29/6476 |
| | | | | | 210/791 |
| 8,251,695 | B2 | * | 8/2012 | Falinower | C04B 11/0281 |
| | | | | | 432/58 |
| 8,272,775 | B2 | * | 9/2012 | Stalder | F26B 11/14 |
| | | | | | 366/144 |
| 8,567,086 | B2 | * | 10/2013 | Kanai | F26B 17/24 |
| | | | | | 34/59 |
| 8,993,747 | B2 | * | 3/2015 | Sprehe | B01F 27/953 |
| | | | | | 536/84 |
| 10,088,398 | B2 | * | 10/2018 | Clark | B01L 3/502 |
| 10,328,364 | B2 | * | 6/2019 | Ross | B01D 21/283 |
| 10,478,791 | B2 | * | 11/2019 | Morinaga | B01F 23/40 |
| 10,656,060 | B2 | * | 5/2020 | Clark | B01L 3/502 |

(56) References Cited

U.S. PATENT DOCUMENTS

| | | | | |
|---|---|---|---|---|
| 10,858,303 | B1* | 12/2020 | Ferraro | C07C 37/84 |
| 10,968,617 | B2* | 4/2021 | Duperon | E03F 5/22 |
| 11,103,812 | B2* | 8/2021 | Canaia | B29C 48/2545 |
| 11,111,743 | B2* | 9/2021 | Ross | B01D 33/41 |
| 11,911,719 | B2* | 2/2024 | Brancazio | B01D 29/608 |
| 11,931,677 | B2* | 3/2024 | Riedel | B01D 21/0084 |
| 2002/0031714 | A1* | 3/2002 | Fumita | G03G 9/0815 |
| | | | | 430/137.17 |
| 2002/0031822 | A1* | 3/2002 | van der Wel | C12M 27/06 |
| | | | | 366/318 |
| 2002/0073572 | A1* | 6/2002 | Stafford | F26B 21/083 |
| | | | | 34/80 |
| 2003/0000101 | A1* | 1/2003 | Fabbri | B08B 9/0933 |
| | | | | 34/467 |
| 2003/0000103 | A1* | 1/2003 | Fabbri | B01D 29/01 |
| | | | | 34/576 |
| 2003/0196951 | A1* | 10/2003 | Tully | B01J 25/04 |
| | | | | 210/511 |
| 2004/0050802 | A1* | 3/2004 | Banister | F26B 3/08 |
| | | | | 210/771 |
| 2004/0159007 | A1* | 8/2004 | Knorr | F26B 11/14 |
| | | | | 34/593 |
| 2005/0242000 | A1* | 11/2005 | Khan | B03D 1/1418 |
| | | | | 209/164 |
| 2008/0067137 | A1* | 3/2008 | Banister | F26B 3/08 |
| | | | | 210/354 |
| 2008/0094934 | A1* | 4/2008 | Chiang | B01F 35/91 |
| | | | | 366/102 |
| 2008/0173594 | A1* | 7/2008 | Stoerzer | B01D 29/01 |
| | | | | 210/791 |
| 2014/0123991 | A1* | 5/2014 | Fujita | B01J 20/22 |
| | | | | 131/335 |
| 2014/0224749 | A1* | 8/2014 | Hopkins | B29C 48/2735 |
| | | | | 210/791 |
| 2016/0317953 | A1* | 11/2016 | Canaia | B29C 48/693 |
| 2017/0252676 | A1* | 9/2017 | Ross | B01D 21/01 |
| 2017/0254163 | A1* | 9/2017 | Ross | B01D 33/76 |
| 2017/0282420 | A1* | 10/2017 | Kitamura | A61K 9/2095 |
| 2018/0161706 | A1* | 6/2018 | Masetto | B01D 29/6476 |
| 2021/0086112 | A1* | 3/2021 | Brancazio | B01D 29/03 |
| 2022/0304330 | A1* | 9/2022 | Misagh | A23G 3/0021 |
| 2022/0305448 | A1* | 9/2022 | Zhang | F26B 25/063 |
| 2023/0417486 | A1* | 12/2023 | Van Der Wel | F26B 11/12 |
| 2024/0066443 | A1* | 2/2024 | Brancazio | B01D 29/86 |

FOREIGN PATENT DOCUMENTS

| | | |
|---|---|---|
| CN | 103980343 A | 8/2014 |
| CN | 104998452 A | 10/2015 |
| CN | 204685095 U | 10/2015 |
| CN | 207872085 U | 9/2018 |
| CN | 209173806 U | 7/2019 |
| CN | 110451587 A | 11/2019 |
| CN | 110898782 A | 3/2020 |
| CN | 111916656 A | 11/2020 |
| CN | 111921434 A | 11/2020 |
| CN | 212625648 U | 2/2021 |
| WO | 2019139181 A1 | 7/2019 |

OTHER PUBLICATIONS

Filter Dryer—Wikipedia—Downloaded May 20, 2024, 2 Pages (Year: 2024).*

* cited by examiner

PROCESSING SYSTEM WITH AGITATED NUTSCHE FILTER AND CONICAL DOUBLE HELIX DRYER

CROSS REFERENCE TO THE RELATED APPLICATIONS

This application is the national stage entry of International Application No. PCT/CN2021/078869, filed on Mar. 3, 2021, which is based upon and claims priority to Chinese Patent Application No. 202010704409.7 filed on Jul. 21, 2020, the entire contents of which are incorporated herein by reference.

TECHNICAL FIELD

The present disclosure relates to the technical field of manufacturing of ternary materials, in particular to an integrated production system for a ternary material.

BACKGROUND

The lithium-ion battery has been commercialized since 1991 because it has a high energy density, a high output voltage, high power, a low self-discharge rate, no memory effect, a wide range of operating temperatures and environmental friendliness. The lithium-ion battery has become the preferred power source for electronic products such as notebook computers, mobile phones, digital cameras and flashlights. The ternary material is one of the main components of the cathode of the existing lithium-ion battery. The ternary material is traditionally synthesized by using a high-temperature solid-phase method, a low-heat solid-phase method, a sol-gel method and a co-precipitation method. However, the material obtained by the solid-phase method is not even in phase and particle size, and volatilization of lithium occurs at high temperatures. The co-precipitation method has a relatively low cost and high material mixing evenness, but the precursor preparation prepared by the co-precipitation method is complicated, and the precipitation rates of different cations are varying. In the sol-gel method, the material is obtained in a liquid phase, and the ions can be fully mixed to obtain a pure-phase material. However, there are many factors that affect the gelation, so it is difficult to control the morphology and particle size of the product. In view of this, a co-precipitation/high-temperature solid-phase method was developed, which uses the co-precipitation method to synthesize to obtain a ternary precursor and then uses the high-temperature solid-phase method to synthesize to obtain a final product. This method is mature and found in a wide range of industrial applications.

The production process of the ternary material with the co-precipitation/high-temperature solid-phase method essentially includes agitating for mixing, precipitation reaction, solid-liquid separation, washing for impurity removal, and drying. Correspondingly, an agitating device, a reactor, an automatic centrifuge, a filter and a dryer are arranged in sequence along the production process flow. This method has a long process route involving a large number of production devices, and has high energy consumption, low efficiency and high consumption of the washing liquid. In addition, the quality of the ternary material cannot be guaranteed, and the cost is high. Therefore, the method obviously cannot meet the requirements of green manufacturing for efficiency enhancement, energy saving, consumption reduction and emission reduction. In particular, most ternary material manufacturers typically use the automatic centrifuge to implement the filtering and washing process. The automatic centrifuge is a batch-type filtering centrifuge with an automatic bottom discharge function. The automatic centrifuge produces a centrifugal force field with a separation factor of 700-1,000 through the high-speed rotation of the rotor system. The ternary material is accelerated in the centrifugal force field, thereby reaching a fast solid-liquid separation speed, achieving a low water content in the obtained filter cake, and improving the drying efficiency of the subsequent drying process. However, the automatic centrifuge used in the filtering and washing process of the ternary material is faced with the following problems. First, the technical parameters of the automatic centrifuge are limited. At present, the automatic centrifuge widely used in industrial applications has a rotor diameter of 1,250 mm and 1,500 mm, and a theoretical maximum processing capacity of about 500 kg in a single batch, which results in a small processing volume. Second, the washing manner is old-fashioned and the washing effect is poor. The automatic centrifuge uses displacement washing, wherein the relatively thick filter cake on the circumferential drum surface is rinsed with the washing liquid from the inside to the outside, resulting in a long washing time, a high consumption of the washing liquid and uneven washing of the material. Third, a single automatic centrifuge has a large power consumption. The automatic centrifuge with a rotor diameter of 1,250 mm has a rated power of 22 kW. During operation, the speed increases and decreases alternately, which requires a large power consumption. Finally, there are a lot of residuals left due to the production characteristics of the ternary material. The ternary material is produced batch by batch. After a batch is completed, the whole machine needs to be washed immediately to avoid the residual of the batch in the drum from affecting the quality of the next batch. The traditional washing operation requires the operator to open the cover and wash the centrifuge, and even requires the operator to enter the semi-enclosed automatic centrifuge for washing, which is time-consuming and laborious, with poor safety and dissatisfactory washing effect. Therefore, for the ternary material manufacturing field, it is urgent to develop an integrated production system to replace the traditional automatic centrifuge to meet the high requirements of the large-scale ternary material production for the water content, washing effect, particle crystal form, purity and closed operation. The integrated production system must effectively ensure its own production capacity and production efficiency while satisfying the requirements of green manufacturing for efficiency enhancement, energy saving, consumption reduction and emission reduction.

SUMMARY

In order to overcome the above shortcomings existing in the prior art, an objective of the present disclosure is to provide an integrated production system for a ternary material. The present disclosure has a reasonable structure and high cost performance. The present disclosure can meet the high requirements of the large-scale ternary material production for the water content, washing effect, particle crystal form, purity and closed operation. The present disclosure can also effectively ensure the production capacity and production efficiency of the system while satisfying the requirements of green manufacturing for efficiency enhancement, energy saving, consumption reduction and emission reduction.

To achieve the above objective, the present disclosure adopts the following technical solution:

An integrated production system for a ternary material includes an agitating device, a water washing tank, an agitated nutsche filter and a dryer arranged in sequence along a travel path of a ternary material, where the agitating device is used to agitate a material; the water washing tank is used to carry out even pulping and provide a reaction space; the agitated nutsche filter is used to realize an agitating and filtering operation on the material; the dryer is used to dry the material;

the agitated nutsche filter includes a tank body composed of an upper shell and a lower base that are axially abutted with each other; the upper shell and the lower base are fitted with each other to define a washing chamber for washing the material; a filtering surface with a water filtering function is provided at the lower base; the filtering surface divides the washing chamber into an agitating chamber and a filtered water chamber located below the agitating chamber; the agitated nutsche filter further includes a spraying assembly for injecting a washing medium and an agitating assembly for agitating the material in the agitating chamber; a feed tube and a solid discharge tube that communicate the agitating chamber are provided on the upper shell, and a water discharge tube communicating the filtered water chamber is provided at the lower base; the upper shell and the lower base are locked by a locking assembly, such that the tank body has two working states: assembled and disassembled; when the tank body is in the assembled state, the upper shell and the lower base are locked with each other through the locking assembly to form the tank body; when the tank body is in the disassembled state, the locking assembly is opened, and the lower base goes down and detaches from the upper shell, thereby exposing the filtering surface at the lower base and a residual filter cake on the filtering surface.

Preferably, the locking assembly may include a locking ring in a coaxial rotary fit with a bottom edge of the upper shell; a lower ring surface of the locking ring may extend vertically downward along an axial direction of the upper shell, and the lower ring surface of the locking ring may be provided with meshing teeth protruding radially inward; an outer wall of the lower base may be in the shape of a two-section stepped shaft with a thin upper part and a thick lower part; the outer wall of a large-diameter section of the lower base may be provided with fitting teeth protruding radially; the fitting teeth may be evenly distributed in sequence along a circumferential direction of the lower base; in a circumferential direction of the locking ring, a distance between adjacent meshing teeth may be greater than a width of the fitting tooth, which may allow the fitting tooth to pass through the gap between the meshing teeth from bottom to top; when the tank body is in the assembled state, a bottom surface of the meshing tooth may engage with a top surface of the fitting tooth, such that a shoulder of the lower base may be tightly pressed against the bottom edge of the upper shell in a sealed manner from bottom to top.

Preferably, the agitated nutsche filter may further include a supporting assembly for lifting the upper shell from a base surface; the supporting assembly may include supporting legs that may be evenly distributed along a circumferential direction of the upper shell; an outer wall of the upper shell may be circumferentially evenly provided with supporting lug seats quantitatively corresponding to the supporting legs; top and bottom ends of each supporting leg may be fixedly fitted with the corresponding supporting lug seat; a piston rod end of a hydraulic cylinder may be hinged at the supporting lug seat; the piston rod end of the hydraulic cylinder may extend vertically downward and may be in a hinged fit with a connecting lug plate fixed at the lower base; there may be two or more hydraulic cylinders distributed in sequence along the circumferential direction of the lower base.

Preferably, the locking ring generates a rotary thrust through a power cylinder provided at the upper shell; an anti-rotation section may extend vertically upward at the meshing teeth, and a fitting groove may be recessed in a corresponding fitting position of the upper shell; when the tank body is in the assembled state, the anti-rotation section may be inserted into the fitting groove.

Preferably, an inner ring surface of the locking ring may be in the shape of a two-section stepped hole with a thin upper part and a thick lower part; the bottom edge of the upper shell may be provided with an outer flange; an upper surface of the outer flange and the shoulder of the locking ring may be in a surface-to-surface rotary fit; the meshing tooth may be externally presented as a wedge-shaped block, and a tip of the meshing tooth may point to a rotation lock direction of the lower base.

Preferably, a movable wheel may be provided at the lower base; the base surface may be provided with a rail that may be fitted with the movable wheel when the movable wheel falls; an anti-deviating guard plate may be provided on an outer side of the rail to prevent the movable wheel from deviating.

Preferably, the agitating assembly may include an agitating shaft provided coaxially with the upper shell; a top end of the agitating shaft may penetrate through a top surface of the upper shell and may be driven by a power motor located above the upper shell; a bottom end of the agitating shaft may be provided with agitating blades; the agitating blade may include a front inclined plate, a rear inclined plate and a bottom plate extending radially outward from the agitating shaft; surface slopes of the front inclined plate and the rear inclined plate may decrease in sequence from the inside to the outside; inner ends of the front inclined plate, the rear inclined plate and the bottom plate may be fixed at a shaft body of the agitating shaft, and outer ends of the front inclined plate, the rear inclined plate and the bottom plate may be closed by an end plate, thus forming a hollow triangular pyramid structure of the agitating blade; there may be an angle between a surface of the bottom plate and a horizontal plane, and the agitating blades may be arranged symmetrically along a circumferential direction of the agitating shaft.

Preferably, plow blades may be provided on the front inclined plate of the agitating blade facing an agitating direction to cut into and turn the material; the plow blade may be presented as an arc-shaped tile that may extend gently downward and forward from a surface of the front inclined plate; the plow blades may be evenly spaced on the front inclined plate along a radial direction of the agitating blade, and travel paths of the plow blades on each agitating blade may be staggered with each other; an intermediate blade may be further provided on a bottom surface of the agitating shaft; the intermediate blade and the travel paths of the plow blade on each agitating blade may cooperate to define a complete circle.

Preferably, a transverse partition plate may be provided in a chamber of the agitating blade; a fitting gap may be provided between a front end of the transverse partition plate and the end plate, thereby dividing the chamber of the agitating blade into an upper heating chamber and a lower heating chamber that communicate with each other only by the fitting gap; a heating inlet and a heating outlet may be provided in the agitating shaft; the heating inlet and the heating outlet may respectively communicate with the corresponding upper heating chamber and lower heating chamber.

Preferably, the integrated production system may further include a three-way conveying tube; an inlet tube of the three-way conveying tube may communicate with an outlet of the solid discharge tube; the dryer may be a double helix dryer; two outlet tubes of the three-way conveying tube respectively may communicate with an inlet of a double helix dryer; a material switching valve may be provided at a three-way junction of the three-way conveying tube to select one outlet tube for discharging.

The present disclosure has the following beneficial effects:

1) On the basis of an original ternary material production system, the present disclosure discards the traditional centrifuge-type filtering structure with a small processing capacity and low efficiency, and instead adopts an agitated nutsche filtration layout. The agitating tank has a large one-time processing capacity, which can adapt to the process requirements of the large-scale ternary material production for low water content and desirable washing effect. Specifically, in actual use, the ternary material first enters the agitating chamber through the feed tube. The spraying assembly, for example, a nozzle, sprays a washing medium synchronously, and the agitating assembly, for example, an agitating paddle or even an agitating plate carries out an agitating operation. The waste liquid generated during the washing and agitating of the ternary material leaks to the filtered water chamber along the filtering surface, and flows out through the water discharge tube. After washing, the ternary material is discharged out of the chamber through the solid discharge tube, thereby completing the operation of a batch. In the above operation, each time the washing of a batch of the ternary material is completed, the chamber needs to be washed. Thus, the tank body needs to be changed to the disassembled state. The locking assembly is opened and the lower base or the upper shell is removed so as to expose the filtering surface on the lower base. Then the residual filter cake at the filtering surface and even the inner wall of the tank body can be quickly and efficiently removed, which is extremely convenient.

Obviously, the present disclosure can meet the high requirements of the large-scale ternary material production process for the water content, washing effect, particle crystal form, purity and closed operation. Meanwhile, the present disclosure can effectively guarantee the production capacity and production efficiency of the system while satisfying the requirements of green manufacturing for efficiency enhancement, energy saving, consumption reduction and emission reduction. The disclosed system can increase the single-line production capacity by 6-10 times, from the original 400 kg per batch to 2,000-4,000 kg, and greatly improves the production efficiency. In addition, the present disclosure can reduce the produced wastewater by 200,000 tons per 10,000 tons of production capacity, and reduces the actual power consumption of the core agitated nutsche filter to only ½ of the rated power, which greatly reduces the power consumption. In the traditional process, the centrifugal equipment consumes about 5.5 kW·h for producing 100 kg of the ternary material. In contrast, the agitated nutsche filter of the present disclosure consumes about 0.8-1 kW·h for producing 100 kg of the ternary material. Based on the annual production capacity of 10,000 tons, the present disclosure can remarkably save the energy consumption by more than $4.5 \times 10^5$ kW·h.

2) The locking assembly may have a variety of locking methods to make the lower base abut against the upper shell so as to realize the sealing function, for example, screwing through threads, inserting through a positioning pin or a positioning post, or even directly relying on an external force of the hydraulic cylinder group. In a further preferred solution of the present disclosure, the present disclosure utilizes the rotation function of the locking ring. The meshing function of the meshing teeth at the locking ring and the fitting teeth at the lower base ensures a sealed fit between the lower base and the upper shell. In comparison, the inserted fit of the positioning pin or the positioning post is uncertain, the thread screwing method is cumbersome, and the force of the hydraulic cylinder group alone is unstable. The locking structure of the locking ring in the present disclosure can ensure the fitting stability and certainty of the tank body in the assembled state as well as the convenience of operation.

3) In actual operation, the system of the present disclosure should be far away from the ground or other base surface, so as to free up a movement space for the lower base. The lower base is driven by a plurality of hydraulic cylinders evenly distributed in the circumferential direction to produce a mechanized and controllable lifting movement. Therefore, when the lower base is separated from the upper shell, the stability, reliability and safety of the entire separation operation can always be guaranteed.

4) Because the present disclosure is designed to achieve large-capacity washing, filtering and drying, the entire tank body is extremely heavy, and the lower base is also extremely heavy. This is one of the fundamental reasons why the hydraulic cylinders are required to drive the lower base to move. In addition, the locking ring needs to be driven by a power cylinder so as to ensure the rotation of the locking ring. Since the locking ring and the upper shell form an integrated structure through the power cylinder, once the locking ring moves, it may drive the lower base to produce a follow-up deviation under high friction, which needs to be eliminated. For this reason, the present disclosure designs an anti-rotation section and a fitting groove. When the lower base is inserted into the locking ring in the axial direction, the anti-rotation section at the lower base is naturally inserted into the fitting groove at the upper shell to form an anti-rotation fit, thereby avoiding accidental follow-up rotation of the lower base.

5) The locking ring has a huge structure, and it can only be clamped on the outer flange of the upper shell by its own gravity in actual operation. If necessary, oil lubrication or grease lubrication may be used to improve the lubrication effect between the upper surface of the outer flange and the shoulder of the locking ring. The special wedge shape of the meshing teeth is intended to facilitate the lower base to snap into the meshing teeth of the locking ring faster, which will not be repeated here.

6) Through the design of the movable wheel and the rail, it is convenient for the base surface to quickly receive the lower base during washing, and more washing space can be freed up through the lateral movement of the lower base along the rail. The anti-deviating guard plate is designed to guide the travel path of the movable wheel.

7) As another highlight of the present disclosure, the agitating assembly of the present disclosure adds a heating-type turning structure and a propeller blade structure on the basis of a conventional agitating structure with an agitating blade and an agitating shaft. Specifically, the agitating blade alone has a hollow triangular pyramid structure. The unique inclined surface of the agitating blade realizes the turning washing of the ternary material and push of the ternary material from the inside to the outside, so as to improve the washing effect, and it also allows the ternary material to move slowly toward the solid discharge tube. In addition, a transverse partition plate is provided in the chamber of the agitating blade, such that the traditional agitating blade is changed into a heating-type blade. Therefore, on the basis of the washing and filtering functions, the present disclosure realizes a function of pre-heating the washed and filtered material. The preheated material enters the next drying process through the solid discharge tube, and the drying efficiency is significantly improved.

Figure 1:
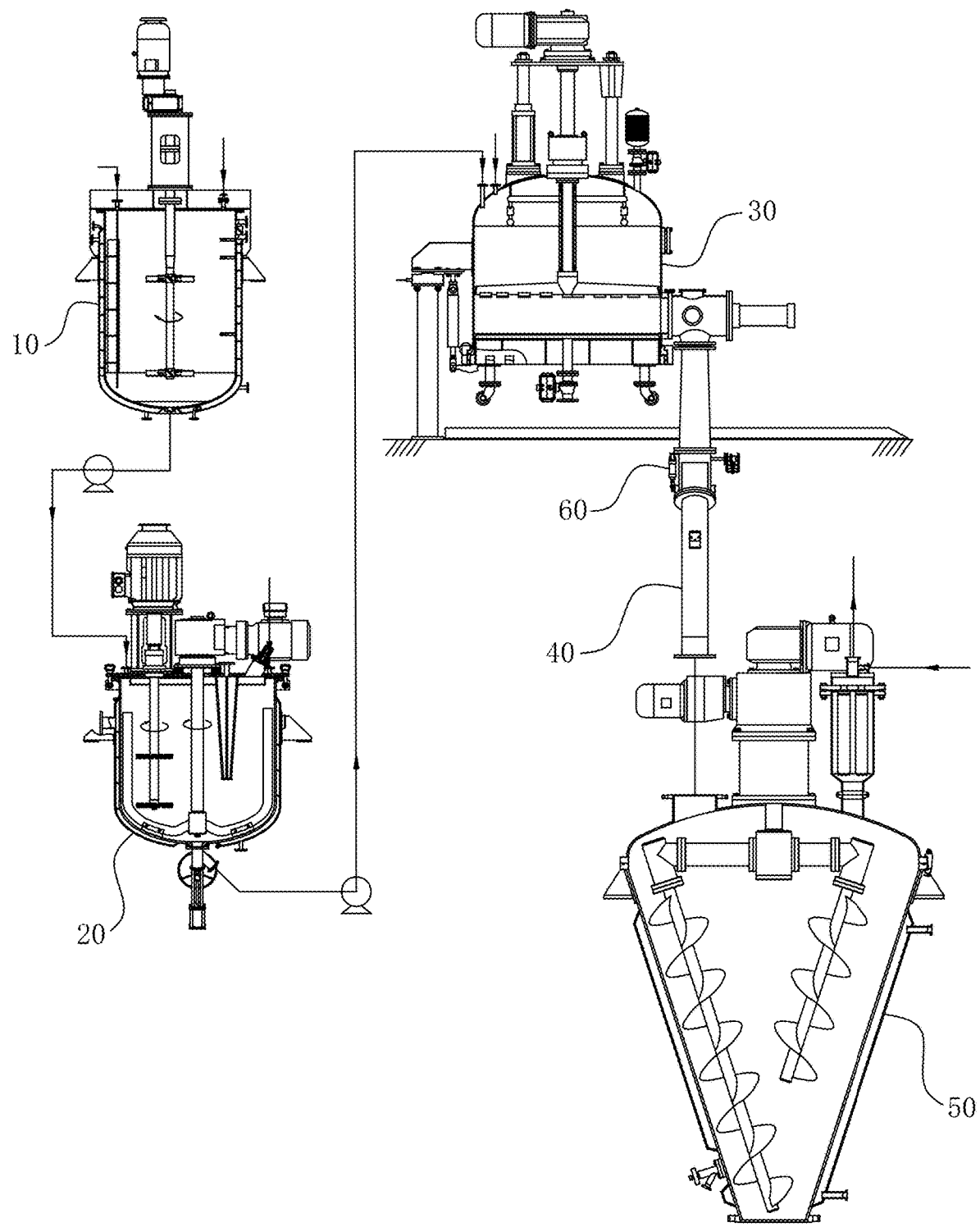
FIG. 1 is a schematic diagram showing a working state according to the present disclosure.

REFERENCE NUMERALS 10. agitating device; 20. water washing tank; 30. agitated nutsche filter;
31. upper shell; 31*a*. outer flange; 31*b*. feed tube; 31*c*. agitating chamber;
32. lower base; 32*a*. filtering surface; 32*b*. connecting lug plate; 32*c*. movable wheel; 32*d*. hydraulic cylinder; 32*e*. filtered water chamber;
33. spraying assembly; 34. agitating assembly;
34*a*. agitating shaft; 34*b*. front inclined state; 34*c*. rear inclined plate; 34*d*. bottom plate; 34*e*. end plate; 34*f*. plow blade; 34*g*. intermediate blade; 34*h*. transverse partition plate;
34*i*. heating inlet; 34*j*. heating outlet;
35. solid discharge tube; 36. water discharge tube; 37. locking assembly;
37*a*. locking ring; 37*b*. meshing tooth; 37*c*. fitting tooth; 37*d*. anti-rotation section; 37*e*. fitting groove;
38*a*. supporting leg; 38*b*. supporting lug seat;
39. rail; 39*a*. anti-deviating guard plate;

40. three-way conveying tube; 50. double helix dryer; 60. material switching valve.

DETAILED DESCRIPTION OF THE EMBODIMENTS

For ease of understanding, the specific structure and working mode of the present disclosure are further described below in conjunction with an overall ternary material production system and process.

The present disclosure provides a ternary material production system, which is essentially based on an agitated nutsche filter 30. The present disclosure organically integrates the functions, such as airtight pressure filtration, agitating, pulping and washing, automatic rotating and unloading, and self-heating, into the agitated nutsche filter 30, which makes the overall structure compact and optimized, thereby effectively shortening the process flow. A high-efficiency water washing tank 20 is provided in a front-end process of the agitated nutsche filter 30, which enables a material to be fully dispersed and reacted. A double helix dryer 50 is provided in a back-end process of the agitated nutsche filter to fully mix and dry the material efficiently without damaging the crystal form of the material. Finally, a high-quality ternary material is obtained, and the entire process meets the requirements of green manufacturing.

More specifically, as shown in FIGS. 1 to 9, the ternary material production system of the present disclosure mainly includes an agitating device 10, a water washing tank 20, an agitated nutsche filter 30, a material switching valve 60 and a double helix dryer 50.

Agitating Device

The agitating device 10 mixes an ionic mixture of Ni, Co and Mn with pure water and a lye. The mixing speed, the structure of agitating paddles and baffles are the key factors that affect the mixing effect. The water washing tank 20 is a device used to implement the even pulping and reaction of the mixed material, and it is also a core device used to prepare a precursor.

The agitating device 10 generally includes an agitating tank. The structural characteristics of the agitating tank, such as the size of a tank body, the type of an agitator, the rotation speed, the number, type and size of baffles and the feeding position, all are key factors affecting the reaction. Similarly, the diameter, number and type of the agitating paddles need to be set according to the technical parameters such as the volume and diameter of the agitating device 10. The evenly distributed baffles on a wall of the agitating device 10 help to improve the mixing effect.

Water Washing Tank

Before the agitated nutsche filter 30 carries out filtering, pulping and washing and pre-drying, a water washing tank 20 for even pulping and reaction needs to be provided. As shown in FIG. 1, the water washing tank 20 is provided with an anchor-type agitator at the center. The anchor-type agitator is provided with an anchor paddle, which has a low speed, generally lower than 100 r/min. The highest position of the anchor paddle must be below a liquid level. In order to prevent the anchor paddle from colliding with the wall of the water washing tank 20, there is generally a certain safety distance, that is, 10-20 mm. The anchor paddle is further provided with a plurality of scrapers, which are generally made of plastic such as polytetrafluoroethylene. The distance between the scraper and the wall of the water washing tank 20 is small, which may be less than 5 mm to prevent the material from accumulating on the wall. In addition, a non-central position of the wall of the water washing tank 20, that is, a position to avoid the anchor-type agitator, is further provided with a high-speed disperser laterally. A main shaft of the high-speed disperser is provided with a serrated dispersing disc. The serrated dispersing disc generally has a small diameter, which is about 200-600 mm, and may be set according to technical parameters such as the reactor volume, diameter and speed. The speed of the high-speed disperser is relatively high, generally 1,000-2,000 r/min. Under the dual action of the anchor-type agitator and the high-speed disperser, the material can be fully mixed to achieve the purpose of efficient pulping and reaction.

Agitated Nutsche Filter

The agitated nutsche filter 30 is the innovation of the present disclosure and also the core of the system. It integrates multiple functions such as solid-liquid filtration, pulping, washing and impurity removal, and pre-drying, which greatly shortens the process flow and efficiently realizes solid-liquid separation.

The specific structure of the agitated nutsche filter 30 is shown in FIGS. 2 to 8. In order to realize automation and intelligence and facilitate the washing of the residual filter cake, the entire agitated nutsche filter 30 is designed as a split structure, including a tank body formed by an upper shell 31 and a lower base 32. In order to prevent iron, zinc, copper and other metal elements from entering the ternary material to affect the product quality, the tank body and the part in contact with the ternary material described later need to be sprayed with tungsten carbide or other wear-resistant materials.

Figure 2:
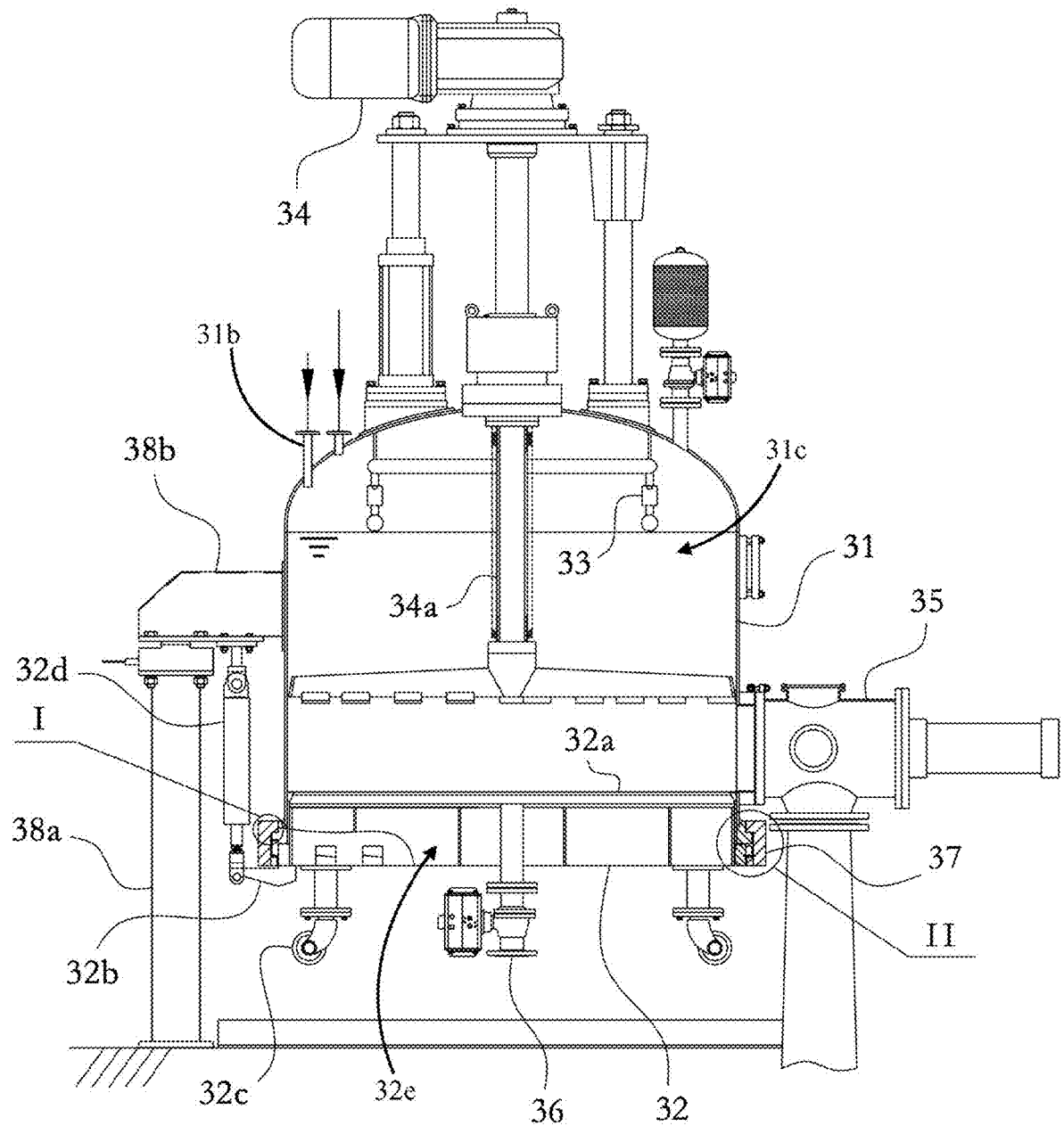
FIG. 2 is a cross-sectional view of an agitated nutsche filter when a tank body is in an assembled state.
Figure 3:
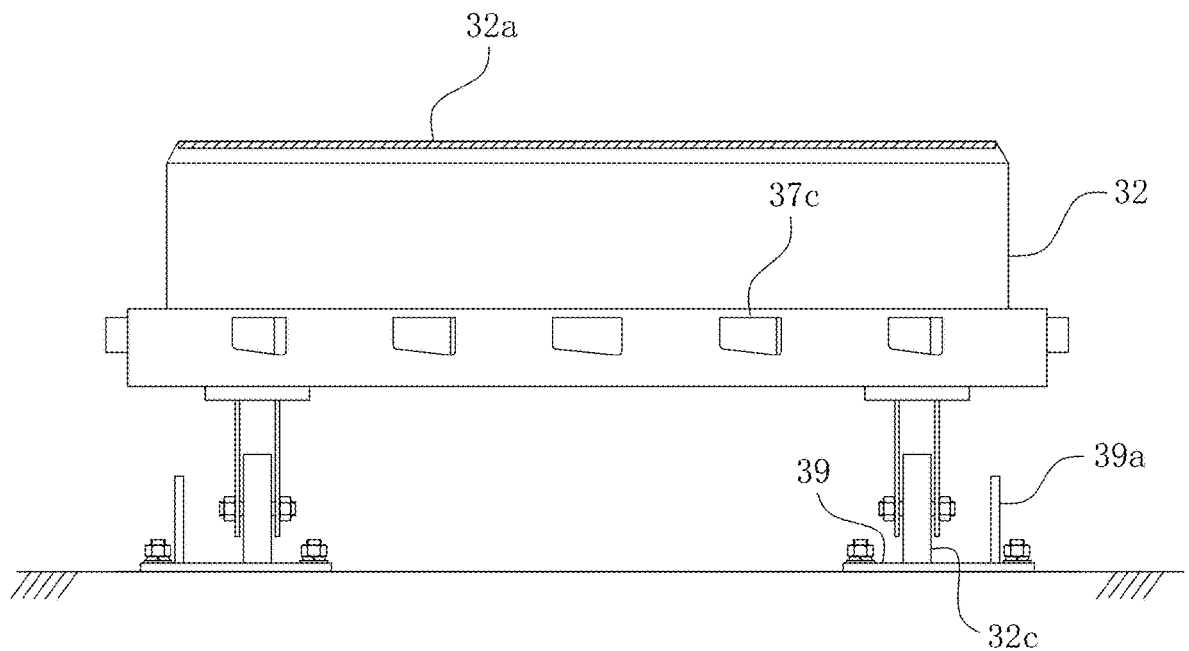
FIG. 3 is a schematic diagram showing a lower base fitted with a base surface when the tank body is in a disassembled state.
Figure 6:
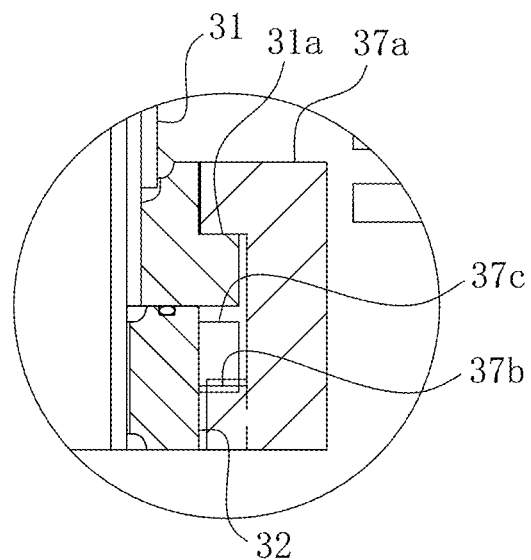
FIG. 6 is a detail of the area II in FIG. 2.

An outer wall of the lower base 32 is in the shape of a two-section stepped shaft with a thin upper part and a thick lower part, such that a small right-angle section of the lower base 32 and a bottom edge of the upper shell 31 are coaxially inserted to realize a sealed fit there-between. If necessary, a gasket as shown in FIG. 6 may be added to improve the sealed fit. When the lower base 32 is inserted into the upper shell 31 from bottom to top, a locking assembly 37 is used to ensure the firm fit and the sealing effect of the lower base 32 and the upper shell 31. As shown in FIGS. 2 and 3, a top surface of the lower base 32 is provided with a filtering surface 32a formed of a filter material such as a metal filter mesh or filter cloth. When the tank body is assembled, the filtering surface 32a naturally defines a double-layer chamber of the tank body, which includes an upper agitating chamber 31c and a lower filtered water chamber 32e. As shown in FIG. 2, in order to ensure the agitating effect in the tank body, an agitating assembly 34 is coaxially provided on the upper shell 31. A feed tube 31b and a spray assembly 33 are provided on the upper shell 31, and a water discharge tube 36 is provided at the bottom of the lower base 32. These components are designed to implement the feeding of the ternary material and a washing medium and the discharge of the washing waste liquid. A solid discharge tube 35 is provided on a side of the upper shell 31 to facilitate discharging. The size of the solid discharge tube 35 is determined according to process parameters such as the cylindrical volume and slag content. The solid discharge tube 35 is connected with an automatic discharging valve, such as a hydraulic automatic opening/closing plunger discharging valve or an electric screw drive opening/closing plunger discharging valve to achieve automatic discharging on demand. If necessary, a sensor may be provided to realize intelligent operation through program interlocking.

Figure 4:
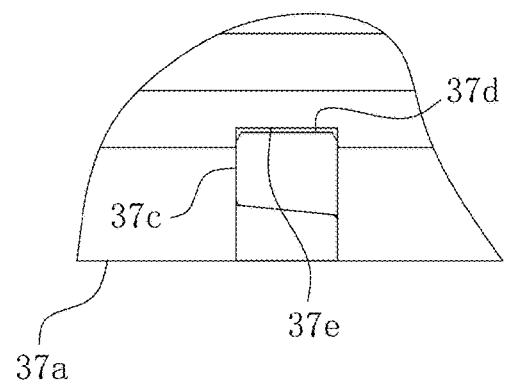
FIG. 4 is a schematic diagram showing an anti-rotation section fitted with a fitting groove.
Figure 5:
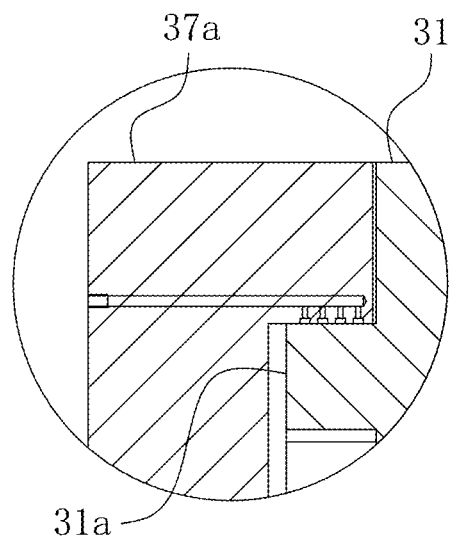
FIG. 5 is a detail of the area I in FIG. 2.

In actual operation, as shown in FIGS. 2 to 5, the locking assembly 37 includes a locking ring 37a. A ring chamber of the locking ring 37a is in the shape of a two-section stepped hole with a thin upper part and a thick lower part. A bottom edge of the upper shell is provided with an outer flange 31a. In assembling operation, the locking ring 37a is coaxially sleeved on an outer wall of the upper shell, and a shoulder of the locking ring 37a and a top surface of the outer flange 31a are in a surface-to-surface rotary fit, so as to realize the rotation of the locking ring 37a. Considering the huge weight of the locking ring 37a, if necessary, the two ends of a power cylinder may be hinged to the outer wall of the upper shell 31 and the locking ring 37a respectively, such that the hydraulic pressure of the power cylinder can be utilized to force the locking ring 37a in the circumferential direction. A plurality of meshing teeth 37b are evenly distributed on an inner wall of a large-aperture section of the locking ring 37a. As shown in FIGS. 3 and 4, the outer wall of the large-diameter section of the lower base 32 is axially evenly distributed with a plurality of fitting teeth 37c.

When the tank body needs to be assembled, the lower base 32 is first lifted and inserted into the upper shell 31 coaxially. Afterwards, under the hydraulic drive of the power cylinder, the locking ring 37a rotates, driving the meshing teeth 37b to rotate, thereby locking with or loosening from the fitting teeth 37c. FIG. 2 shows an implementation. That is, when the locking ring 37a rotates clockwise, the fitting teeth 37c and the meshing teeth 37b are meshed and locked; on the contrary, the fitting teeth 37c and the meshing teeth 37b are loosened and non-meshed. In order to prevent the lower base 32 from self-rotating under the action of the meshing friction of the meshing teeth 37b during the meshing process to cause the meshing fail, two or more fitting teeth 37c may be selected as anti-rotation teeth among the plurality of fitting teeth 37c evenly distributed on the outer circumference of the lower base 32. In other words, the anti-rotation tooth should extend vertically upward to form an anti-rotation section 37d as shown in FIG. 4, and correspondingly, a fitting groove 37e is provided at the upper shell 31 to cooperate with the anti-rotation section 37d, thereby forming an anti-rotation fit similar to a fit between a key groove and a key. Because the upper shell 31 is fixed, under the fit between the anti-rotation section 37d of the anti-rotation tooth and the fitting groove 37e, the freedom of the lower base 32 in the circumferential direction is eliminated, which prevents the self-rotation of the lower base during the meshing process.

Through the automatic opening and closing technology of the large-diameter hydraulic tooth-meshed cylinder flange, the present disclosure can realize the automatic opening and closing of a full series of hydraulic tooth-meshed cylinder flanges with a diameter of 2,000-3,200 mm, with a remarkable effect.

Further, during the meshing rotation, the shoulder of the locking ring 37a and a corresponding surface of the outer flange 31a of the upper shell 31 are force-receiving surfaces that interact with each other. When the meshing teeth 37b and the fitting teeth 37c are meshed and locked, the generated pressure will be transmitted to the upper shell 31 through the locking ring 37a, and finally transmitted to the base surface through supporting lug seats 38b and supporting legs 38a. In order to make the locking ring 37a rotate smoothly during the locking process, an oil groove is provided on the shoulder of the locking ring 37a. When in use, an appropriate amount of grease may be added to the oil groove through an oil filling hole to play a lubricating effect. Of course, a suitable amount of lubricating material such as graphite may also be embedded in the shoulder of the locking ring 37a to achieve the lubricating function.

Further, in order to realize the automatic and intelligent operation, as shown in FIG. 2, a weight sensor may be provided between the supporting lug seat 38b and the supporting leg 38a of the upper shell 31. After a program calculation, the washing liquid is automatically added in proportion to the weight of the material so as to realize intelligent operation. Generally, there are two or three supporting lug seats 38b evenly distributed. As shown in FIG. 2, the lower base 32 and the supporting lug seat 38b are connected by a hydraulic cylinder 32d. A piston rod end of the hydraulic cylinder 32d is hinged to a bottom surface of the supporting lug seat 38b. The piston rod end of the hydraulic cylinder 32d is hinged to a connecting lug plate 32b, and the connecting lug plate 32b is then fixed to the lower base 32. The vertical expansion and contraction of the hydraulic cylinder 32d enables a vertical mechanical lifting function of the lower base 32.

In addition, movable wheels 32c are provided at the bottom of the lower base 32. There are preferably four movable wheels 32c. Generally, universal wheels are provided in two front rows for guiding, and fixed wheels are provided in two rear rows. In order to prevent the lower base 32 from collision and damage due to the uncontrollable guidance during the movement, and to prevent the heavy lower base 32 from damaging the base surface, it is generally necessary to provide a rail 39 on the corresponding base surface. When the locking assembly 37 is released, after the lower base 32 is driven down by the hydraulic cylinder 32d, the movable wheel 32c directly enters the rail 39. The rail is convenient to move and has a fixed direction. As shown in FIG. 3, in order to prevent deviation, an anti-deviating guard plate 39a may be provided on an outer side of the rail 39. The height of the anti-deviating guard plate 39a is slightly smaller than the diameter of the movable wheel 32c. The rail 39 is generally made of a steel plate, which can reduce friction, facilitate the movement of the lower base 32, and can also protect the epoxy floor paint surface in a factory area.

Further, in order to reduce the power consumption of the agitated nutsche filter 30 and realize energy saving, the structure of the agitating assembly 34 is also improved in the present disclosure. While the structures of the agitating blade, the agitating shaft 34a and the power motor of the traditional agitating assembly 34 are retained, the present disclosure designs the agitating blade as a hollow triangular pyramid structure to achieve the multiple purposes of lightweight, self-heating, self-turning and self-pushing.

Figure 7:
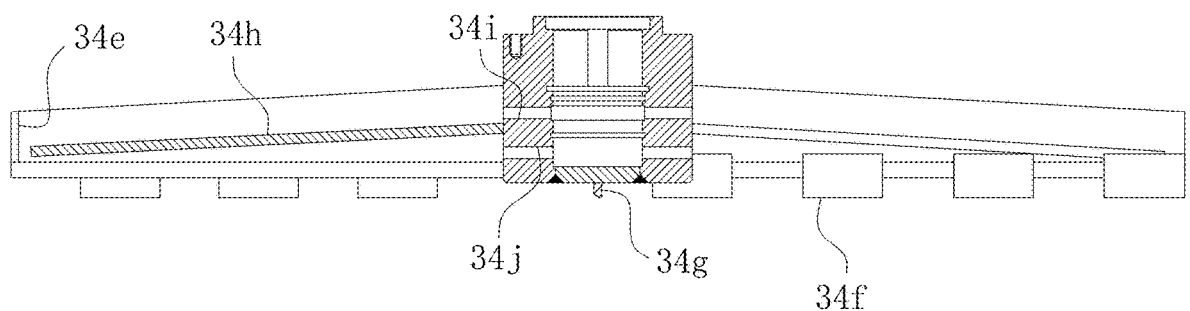
FIG. 7 is a schematic structural diagram of an agitating blade.
Figure 8:
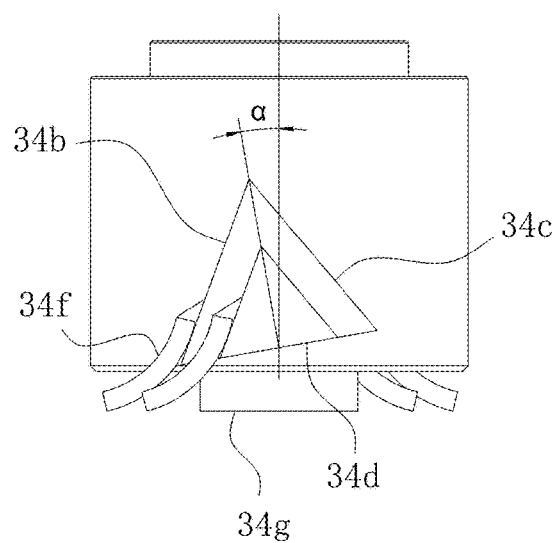
FIG. 8 is a left view of FIG. 7.

Specifically, as shown in FIGS. 2, 7 and 8, actually two agitating blades may be arranged symmetrically along the agitating shaft 34a. The two agitating blades have the same size to balance the two sides, so as to balance the working force. Taking the agitating blade on one side as an example, it is surrounded by a front inclined plate 34b, a rear inclined plate 34c, a bottom plate 34d and an end plate 34e, which form a triangular hollow chamber structure. The slope of the cross section of the triangular hollow chamber of the agitating blade gradually decreases from the center to the outside. A large end, that is, an inner end, is welded and fixedly connected with the agitating shaft 34a by a mounting seat, and a smaller end, that is, an outer end, extends to a cylindrical wall of the upper shell 31, thus finally forming a triangular pyramid structure similar to a truncated cone. In the cross section of the agitating blade, since the front inclined plate 34b and the rear inclined plate 34c are consistent and symmetrical in shape, the cross section presents an isosceles or even an equilateral triangle. Meanwhile, an angle α between the bottom plate 34d and a horizontal plane is generally 7-12°, so as to avoid friction between the entire surface of the bottom plate 34d and the material. In an actual cutting scraping operation, only the cutting edge of a plow blade cuts into the filter cake. It linearly contacts the filter cake, which reduces the damage to the crystals of the filter cake. A plurality of plow blades 34f are arranged at intervals, which reduces the pressing force on the filter cake and is beneficial to maintaining the crystal form, thereby avoiding the disadvantageous situation that damages the crystal form and consumes power. The slope of the cross section of the triangular hollow chamber of the agitating blade gradually decreases from the center to the outside. Therefore, when the entire blade rotates, a thrust is generated outward, pushing the material outward from the center until it is slowly discharged from the solid discharge tube 35. The plow blades 34f are also intermittently welded to the front inclined plate 34b of each agitating blade. It can be seen from FIG. 6 that the trajectories of the circles made by the plow blades 34f are staggered, that is, they do not interfere with each other. A bottom surface of the mounting seat of the agitating shaft 34a is further provided with an intermediate blade 34g, which is used to scrape the material directly under the agitating shaft 34a that cannot be scraped by the plow blade 34f. In a top view, the circular trajectory of each plow blade 34f and the revolving trajectory of the intermediate blade 34g cooperate with each other to form a complete circle so as to cover the entire filtering surface 32a of the agitated nutsche filter 30. The curved tile-like design of the plow blade 34f is convenient for cutting into and turning the material.

On the basis of the lightweight, self-turning and self-pushing structure, the agitating blade further has a self-heating function. Specifically, taking the agitating blade on one side as an example, the triangular hollow chamber of the agitating blade is further welded with a transverse partition plate 34h. The transverse partition plate can be used to strengthen the hollow chamber, such that the agitating blade can withstand the filtration pressure, and also divide the triangular hollow chamber into an upper heating chamber and a lower heating chamber. It can be seen in FIG. 6 that a fitting gap is left between the agitating blade and the end plate 34e, such that the upper heating chamber and the lower heating chamber communicate with each other. The upper heating chamber communicates with a heating inlet 34i at the agitating shaft 34a, and the lower heating chamber communicates with a heating outlet 34j at the agitating shaft 34a. In a pre-drying stage of the ternary material, a heat source such as steam can be introduced from the center of the agitating shaft 34a. The heat source enters from the heating inlet 34i, and reaches the lower heating chamber through the upper heating chamber and the fitting gap. Finally, the heat source is discharged from the heating outlet 34j to form a heat exchange path. The agitating blade on the other side is provided in the same way. In this way, the agitating blade can directly pre-dry the ternary material with the heat source. During the drying process, the agitating blade can also be rotated to turn the material over, thereby improving the heat transfer efficiency and making the heating process of the ternary material more evenly.

Double Helix Dryer

The double helix dryer 50 is a low-shear, high-efficiency drying device. The double helix dryer 50 can revolve and rotate at a low speed to achieve a desirable mixing effect. In addition, it has a low mixing intensity and a weak shearing force, so it can ensure the integrity of the crystal form of the material and ensure the product quality. The material drying cycle is long. In order to ensure the fitting of the process, a material switching valve 60 is generally provided between the agitated nutsche filter 30 and the double helix dryer 50. The material switching valve 60 automatically switches, such that one agitated nutsche filter 30 is matched with two double helix dryers 50, making the process times fit with each other.

Figure 9:
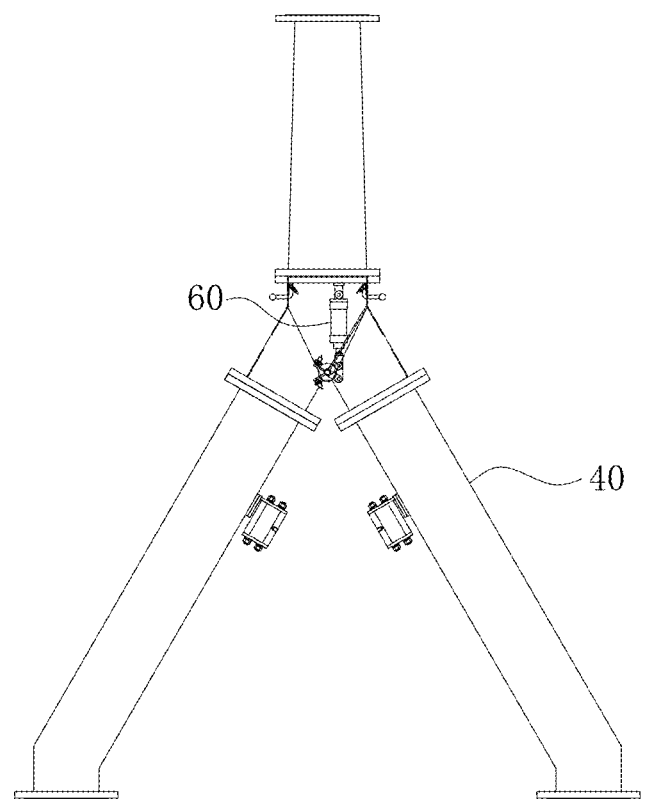
FIG. 9 is a schematic diagram showing a working state of a material switching valve.

As shown in FIG. 9, in the actual design, the deviation of a valve plate is controlled by a cylinder at a joint of the material switching valve 60 where a three-way conveying tube 40 is provided, so as to realize the rapid switching of the material between the two outlet tubes of the three-way conveying tube 40. The deviation position of the valve plate is sensed by a sensor, and according to the signal, it can be known which outlet tube and which double helix dryer 50 for the material to enter. In order to prevent the material from accumulating in an upper space of the valve plate, nozzles are arranged in the circumferential direction of the upper space of the valve plate, and compressed air is sprayed regularly to prevent material accumulation. If the outlet tube is a long tube, an air hammer may be provided on the outside of the outlet tube to periodically beat the outlet tube so as to prevent accumulation. In order to prevent iron, zinc, copper and other metal elements from entering the ternary material to affect the product quality, the contact part of the three-way conveying tube 40 with the material needs to be sprayed with tungsten carbide or other wear-resistant materials.

After the material is filtered, pulped, washed and pre-dried in the agitated nutsche filter 30, the material is discharged by an automatic discharging valve, and falls into a corresponding double helix dryer 50 through the three-way conveying tube 40. A heat source may be fed into the double helix dryer 50, and under the dual action of the revolution and rotation of the double helix, the material is fully mixed with the heat source and dried. In order to improve the drying efficiency, an upper part of a head of the double helix dryer 50 is provided with a vacuum port, which can accelerate the drying process by vacuuming. In order to prevent the material from being sucked away, a dust collector may further be provided at the double helix dryer 50, with a filter element inside. The number, material and precision of the filter elements are determined according to actual needs. The upper part of the dust collector is provided with a vacuum port. When vacuuming, if the material dust is sucked, it will be trapped on an outer filtering surface of the filter element. After the vacuuming is completed, back-blowing may be carried out through a back-blowing port to blow the material dust trapped on the outer filtering surface of the filter element into the double helix dryer 50. Alternatively, when vacuuming, the material dust may be trapped in an inner filtering surface of the filter element, which may be determined according to the structure of the filter element.

In the specific operation, in order to make the solid discharge and conveyance of the agitated nutsche filter 30 unblocked, the agitated nutsche filter 30 is generally provided upstairs or on a platform to have a certain height. The double helix dryer 50 is provided at a corresponding low position. The agitated nutsche filter and the double helix dryer are connected through the material switching valve 60 and the three-way conveying tube 40. In this way, the solid material of the agitated nutsche filter 30 may fall freely by gravity, and the conveying method is reliable.

In order to facilitate a further understanding of the green manufacturing system of the present disclosure, the specific operating mode of the present disclosure is further described in conjunction with the following production processes.

1) The raw materials of the ternary material, namely $NiSO_4$, $MnSO_4$ and $CoSO_4$, are fully agitated with pure water according to a set ratio such as 5:2:3 in the agitating device 10 to produce a salt solution of the ternary material. The concentration of the solution is controlled at about 20-40%, and the density of the solution is controlled at 1.1-1.4.

2) The salt solution of the ternary material is pumped from the agitating device 10 into the water washing tank 20, and a dilute lye, a complexing agent, a coating agent and pure water are added at the same time to carry out a complexation reaction and aging. The pH is controlled at 11±2, the reaction temperature is 60° C. and maintained, the reaction time is ≤1 h, and the particle diameter is controlled at 5 μm. In order to achieve the above process requirements, the agitating rate of the main shaft of the water washing tank 20 is 0-40 rpm, usually 30 rpm; the speed of the side paddle is 0-600; commonly 400 rpm; the dispersing disc is sprayed with 0.3 mm tungsten carbide (WC) to prevent copper, iron and zinc from entering and affecting the quality of the material.

3) After aging, the concentration of the pulp of the ternary material is controlled at 35-50%, the particle diameter distribution is $D_{50}$=8-12 μm, $D_0$≥1 μm. The pulp then enters the agitated nutsche filter 30. A dry powder is added, and the pulp is washed with the pure water and dilute lye. After washing, the water content of the filter cake is less than 7%. The operation cycle is less than 2.5 h, the solid content of the mother liquor is less than 0.1%, and the flatness of the filter cake is less than 10% the thickness of the filter cake.

4) The washed filter cake enters the double helix dryer 50 through the solid discharge tube 35 for drying. At this time, the retention rate of the crystal form of the ternary material is greater than 96%, thereby obtaining a high-quality finished ternary material.

Practice has proved that the disclosed system can increase the single-line production capacity by 6-10 times, from the original 400 kg per batch to 2,000-4,000 kg, and can greatly improve the production efficiency. In addition, the present disclosure can reduce the produced wastewater by 200,000 tons per 10,000 tons of production capacity. The process of the present disclosure adopts a multi-functional integration concept to organically unify the pulping, washing, filtering, pre-drying and drying. The present disclosure has high adaptability to the ternary material, large processing capacity, short process flow, short washing time, low consumption of the washing liquid, less produced wastewater, and satisfies the requirements of green manufacturing for efficiency enhancement, energy saving, consumption reduction and emission reduction.

The maximum diameter of the core of the entire process of the present disclosure, that is, the agitated nutsche filter 30, can reach 3,600 mm, and the effective filtering surface 32a has an area of 10 m². The locking assembly 37 adopts a hydraulic meshing technology for automatic opening and closing, which provides a basis for realizing the full automation of the filter, greatly shortening the discharge time and the opening and closing time of the cylinder. Compared with the traditional integral type and bolt quick-opening type, the opening and closing method of the agitated nutsche filter 30 with a diameter of 3,200 mm in the present disclosure can save more than 50 min of time.

Specifically:

TABLE 1

Comparison of connection methods of filter cylinders

| Connection method | Integral | Bolt quick-opening | Hydraulic meshing |
|---|---|---|---|
| Wash or replace the filter medium | Enter by manhole | Disassemble the flat filter | Disassemble the flat filter |
| Disassembly time | — | At least a few minutes | Less than a minute |
| Disassembly method | — | Artificial | Automatic |
| Labor intensity of disassembly and assembly | — | High | Lowest |

In summary, the technical features of the device and process of the present disclosure meet the high requirements of the large-scale ternary material production process for the water content, washing effect, particle crystal form, purity and closed operation. The present disclosure can increase the production capacity by 6-10 times, and can improve the production efficiency. The present disclosure reduces the actual power consumption of the core agitated nutsche filter 30 to only ½ of the rated power, which greatly reduces the power consumption. In the traditional process, the centrifugal equipment consumes about 5.5 kW·h for producing 100 kg of the ternary material. In contrast, the agitated nutsche filter 30 of the present disclosure consumes about 0.8-1 kW·h for producing 100 kg of the ternary material. Based on the annual production capacity of 10,000 tons, the present disclosure can remarkably save the energy consumption by more than $4.5 \times 10^5$ kW·h. Compared with the existing ternary material manufacturing device and production process, the device and process of the present disclosure are significantly improved in terms of efficiency enhancement, consumption reduction, emission reduction, automation and process flow simplification, and conform to green manufacturing.

What is claimed is:

1. An integrated production system for a ternary material, comprising:
    an agitating device for receiving and agitating materials;
    a water washing tank for receiving materials exiting the agitating device, even pulping and providing a reaction space;
    an agitated nutsche filter for receiving materials exiting the water washing tank, including:
    a tank body having:
        an upper shell defining an agitating chamber and having:
        a feed tube for introducing material into the agitating chamber; and
        a solid discharge tube in fluid communication with the agitating chamber to permit accumulated solids to exit the agitating chamber;
        a lower base including a filtering surface spanning the cross-section of the lower base, defining a filtered water chamber below the filtering surface and bounded by the lower base, a water discharge tube in fluid communication with the filtered water chamber is provided at the lower base to permit filtered water to exit the filtered water chamber;
        a locking assembly;
        wherein the upper shell and the lower base are sized and shaped to be axially abutted and fitted to each other, and be sealingly and detachably held together with the locking assembly;
    a spraying assembly for injecting a washing medium into the agitating chamber;
    an agitating assembly disposed within the agitating chamber for agitating materials in the agitating chamber; and
    a dryer for receiving and drying solids exiting the agitated nutsche filter;
    wherein the agitating device, the water washing tank, the agitated nutsche filter and the dryer are sequentially arranged to provide fluid flow along a travel path of a ternary material from the agitating device to the water washing tank, then to the agitated nutsche filter, and then to the dryer.

2. The integrated production system for the ternary material according to claim 1, wherein the locking assembly comprises:
    a locking ring in a coaxial rotary fit with a bottom edge of the upper shell;
    a lower ring surface of the locking ring extends vertically downward along an axial direction of the upper shell, and the lower ring surface of the locking ring is provided with meshing teeth protruding radially inward;
    an outer wall of the lower base is in the shape of a two-section stepped shaft with a thin upper part having a diameter and a thick lower part having a larger diameter than the thin upper part; the outer wall of the thick lower part of the lower base is provided with fitting teeth protruding radially; the fitting teeth are evenly distributed around the circumference of the lower base; in a circumferential direction of the locking ring, a distance between adjacent meshing teeth is greater than a width of the fitting tooth to allow the fitting tooth to pass through a gap between the meshing teeth from bottom to top; wherein when the tank body is in the assembled state, a bottom surface of the meshing tooth engages with a top surface of the fitting tooth to tightly press a shoulder of the lower base against the bottom edge of the upper shell in a sealed manner from bottom to top.

3. The integrated production system for the ternary material according to claim 2, wherein the agitating assembly comprises:
    an agitating shaft provided coaxially with the upper shell;
    a top end of the agitating shaft penetrates through a top surface of the upper shell and is driven by a power motor located above the upper shell; and
    a bottom end of the agitating shaft comprises agitating blades, each agitating blade comprises:
        a front inclined plate, and
        a rear inclined plate and a bottom plate extending radially outward from the agitating shaft; wherein surface slopes of the front inclined plate and the rear inclined plate decrease in sequence from inside to outside; inner ends of the front inclined plate, the rear inclined plate and the bottom plate are fixed at a shaft body of the agitating shaft, and outer ends of the front inclined plate, the rear inclined plate and the bottom plate are closed by an end plate to form a hollow triangular pyramid structure of the agitating blade; an angle is formed between a surface of the bottom plate and a horizontal plane, and the agitating blades are arranged symmetrically around the circumference of the agitating shaft.

4. The integrated production system for the ternary material according to claim 2, wherein the integrated production system further comprises:
   a three-way conveying tube, wherein an inlet tube of the three-way conveying tube communicates with an outlet of the solid discharge tube, the dryer is a double helix dryer, and two outlet tubes of the three-way conveying tube respectively communicate with an inlet of the double helix dryer; and
   a material switching valve is provided at a three-way junction of the three-way conveying tube to select one of the two outlet tubes for discharging.

5. The integrated production system for the ternary material according to claim 2, wherein the agitated nutsche filter further comprises a supporting assembly for lifting the upper shell from a base surface; the supporting assembly comprises a supporting leg; and an outer wall of the upper shell is provided with a supporting lug seat; a piston rod end of a hydraulic cylinder is hinged at the supporting lug seat; the piston rod end of the hydraulic cylinder extends vertically downward and is in a hinged fit with a connecting lug plate fixed at the lower base.

6. The integrated production system for the ternary material according to claim 5, wherein a movable wheel is provided at the lower base; the base surface is provided with a rail that receives with the movable wheel when the movable wheel is lowered; an anti-deviating guard plate is provided on an outer side of the rail to prevent the movable wheel from deviating off the rail.

7. The integrated production system for the ternary material according to claim 5, wherein the agitating assembly comprises:
   an agitating shaft provided coaxially with the upper shell;
   a top end of the agitating shaft penetrates through a top surface of the upper shell and is driven by a power motor located above the upper shell; and
   a bottom end of the agitating shaft comprises agitating blades, each agitating blade comprises:
   a front inclined plate, and
   a rear inclined plate and a bottom plate extending radially outward from the agitating shaft; wherein surface slopes of the front inclined plate and the rear inclined plate decrease in sequence from inside to outside; inner ends of the front inclined plate, the rear inclined plate and the bottom plate are fixed at a shaft body of the agitating shaft, and outer ends of the front inclined plate, the rear inclined plate and the bottom plate are closed by an end plate to form a hollow triangular pyramid structure of the agitating blade; an angle is formed between a surface of the bottom plate and a horizontal plane, and the agitating blades are arranged symmetrically around the circumference of the agitating shaft.

8. The integrated production system for the ternary material according to claim 5, wherein the integrated production system further comprises:
   a three-way conveying tube, wherein an inlet tube of the three-way conveying tube communicates with an outlet of the solid discharge tube, the dryer is a double helix dryer, and two outlet tubes of the three-way conveying tube respectively communicate with an inlet of the double helix dryer; and
   a material switching valve is provided at a three-way junction of the three-way conveying tube to select one of the two outlet tubes for discharging.

9. The integrated production system for the ternary material according to claim 5, wherein an anti-rotation section extends vertically upward at the meshing teeth, and a fitting groove is recessed in a corresponding fitting position of the upper shell; wherein when the tank body is in the assembled state, the anti-rotation section is inserted into the fitting groove.

10. The integrated production system for the ternary material according to claim 9, wherein a movable wheel is provided at the lower base; the base surface is provided with a rail that receives with the movable wheel when the movable wheel is lowered; an anti-deviating guard plate is provided on an outer side of the rail to prevent the movable wheel from deviating off the rail.

11. The integrated production system for the ternary material according to claim 9, wherein the agitating assembly comprises:
   an agitating shaft provided coaxially with the upper shell;
   a top end of the agitating shaft penetrates through a top surface of the upper shell and is driven by a power motor located above the upper shell; and
   a bottom end of the agitating shaft comprises agitating blades, each agitating blade comprises:
   a front inclined plate, and
   a rear inclined plate and a bottom plate extending radially outward from the agitating shaft; wherein surface slopes of the front inclined plate and the rear inclined plate decrease in sequence from inside to outside; inner ends of the front inclined plate, the rear inclined plate and the bottom plate are fixed at a shaft body of the agitating shaft, and outer ends of the front inclined plate, the rear inclined plate and the bottom plate are closed by an end plate to form a hollow triangular pyramid structure of the agitating blade; an angle is formed between a surface of the bottom plate and a horizontal plane, and the agitating blades are arranged symmetrically around the circumference of the agitating shaft.

12. The integrated production system for the ternary material according to claim 9, wherein the integrated production system further comprises:
   a three-way conveying tube, wherein an inlet tube of the three-way conveying tube communicates with an outlet of the solid discharge tube, the dryer is a double helix dryer, and two outlet tubes of the three-way conveying tube respectively communicate with an inlet of the double helix dryer; and
   a material switching valve is provided at a three-way junction of the three-way conveying tube to select one of the two outlet tubes for discharging.

13. The integrated production system for the ternary material according to claim 9, wherein an inner ring surface of the locking ring is in the shape of a two-section stepped hole with a thin upper part and a thick lower part; the bottom edge of the upper shell is provided with an outer flange; an upper surface of the outer flange and a shoulder of the locking ring are in a surface-to-surface rotary fit; each meshing tooth is externally presented as a wedge-shaped block, and a tip of each meshing tooth points to a rotation lock direction of the lower base.

14. The integrated production system for the ternary material according to claim 13, wherein a movable wheel is provided at the lower base; the base surface is provided with a rail that receives with the movable wheel when the movable wheel is lowered; an anti-deviating guard plate is provided on an outer side of the rail to prevent the movable wheel from deviating off the rail.

15. The integrated production system for the ternary material according to claim 13, wherein the agitating assembly comprises:
- an agitating shaft provided coaxially with the upper shell;
- a top end of the agitating shaft penetrates through a top surface of the upper shell and is driven by a power motor located above the upper shell; and
- a bottom end of the agitating shaft comprises agitating blades, each agitating blade comprises:
  - a front inclined plate, and
  - a rear inclined plate and a bottom plate extending radially outward from the agitating shaft; wherein surface slopes of the front inclined plate and the rear inclined plate decrease in sequence from inside to outside; inner ends of the front inclined plate, the rear inclined plate and the bottom plate are fixed at a shaft body of the agitating shaft, and outer ends of the front inclined plate, the rear inclined plate and the bottom plate are closed by an end plate to form a hollow triangular pyramid structure of the agitating blade; an angle is formed between a surface of the bottom plate and a horizontal plane, and the agitating blades are arranged symmetrically around the circumference of the agitating shaft.

16. The integrated production system for the ternary material according to claim 13, wherein the integrated production system further comprises:
- a three-way conveying tube, wherein an inlet tube of the three-way conveying tube communicates with an outlet of the solid discharge tube, the dryer is a double helix dryer, and two outlet tubes of the three-way conveying tube respectively communicate with an inlet of the double helix dryer; and
- a material switching valve is provided at a three-way junction of the three-way conveying tube to select one of the two outlet tubes for discharging.

17. The integrated production system for the ternary material according to claim 1, wherein the agitating assembly comprises:
- an agitating shaft provided coaxially with the upper shell;
- a top end of the agitating shaft penetrates through a top surface of the upper shell and is driven by a power motor located above the upper shell; and
- a bottom end of the agitating shaft comprises agitating blades, each agitating blade comprises:
  - a front inclined plate, and
  - a rear inclined plate and a bottom plate extending radially outward from the agitating shaft; wherein surface slopes of the front inclined plate and the rear inclined plate decrease in sequence from inside to outside; inner ends of the front inclined plate, the rear inclined plate and the bottom plate are fixed at a shaft body of the agitating shaft, and outer ends of the front inclined plate, the rear inclined plate and the bottom plate are closed by an end plate to form a hollow triangular pyramid structure of the agitating blade; an angle is formed between a surface of the bottom plate and a horizontal plane, and the agitating blades are arranged symmetrically around the circumference of the agitating shaft.

18. The integrated production system for the ternary material according to claim 17, wherein
- plow blades for cutting and turning the materials are provided on each front inclined plate of each agitating blade facing an agitating direction; each plow blade is an arc-shaped tile extending downward and forward from a surface of the front inclined plate; the plow blades are evenly spaced on each front inclined plate along a radial direction of the agitating blade, and travel paths of the plow blades on each adjacent agitating blade are staggered with each other; and
- an intermediate blade is provided on a bottom surface of the agitating shaft; wherein the intermediate blade and the travel paths of the plow blades on each agitating blade cooperate to define a complete circle.

19. The integrated production system for the ternary material according to claim 17, wherein a transverse partition plate is provided in a chamber of the agitating blade; a fitting gap is provided between a front end of the transverse partition plate and the end plate to divide the chamber of the agitating blade into an upper heating chamber and a lower heating chamber, wherein the upper heating chamber and the lower heating chamber communicate with each other only by the fitting gap; a heating inlet and a heating outlet are provided in the agitating shaft; the heating inlet and the heating outlet respectively communicate with the upper heating chamber and lower heating chamber.

20. The integrated production system for the ternary material according to claim 1, wherein the integrated production system further comprises:
- a three-way conveying tube, wherein an inlet tube of the three-way conveying tube communicates with an outlet of the solid discharge tube, the dryer is a double helix dryer, and two outlet tubes of the three-way conveying tube respectively communicate with an inlet of the double helix dryer; and
- a material switching valve is provided at a three-way junction of the three-way conveying tube to select one of the two outlet tubes for discharging.

* * * * *